May 22, 1956  O. B. VETTER  2,746,292
APPARATUS FOR MEASURING THE NET AMOUNT
OF FOREIGN MATTER IN A FLOWING LIQUID
Filed April 5, 1952  6 Sheets-Sheet 1

SPECIFIC GRAVITY CORRECTION FACTOR:
UNCORRECTED FLOW × F = TOTAL SOLIDS

INVENTOR.
Otto B. Vetter
BY
Kegan and Kegan
Attys

May 22, 1956           O. B. VETTER           2,746,292
APPARATUS FOR MEASURING THE NET AMOUNT
OF FOREIGN MATTER IN A FLOWING LIQUID
Filed April 5, 1952           6 Sheets-Sheet 2

INVENTOR.
Otto B. Vetter
BY
Kegan and Kegan
Attys.

INVENTOR.
Otto B. Vetter
BY
Kegan and Kegan
attys.

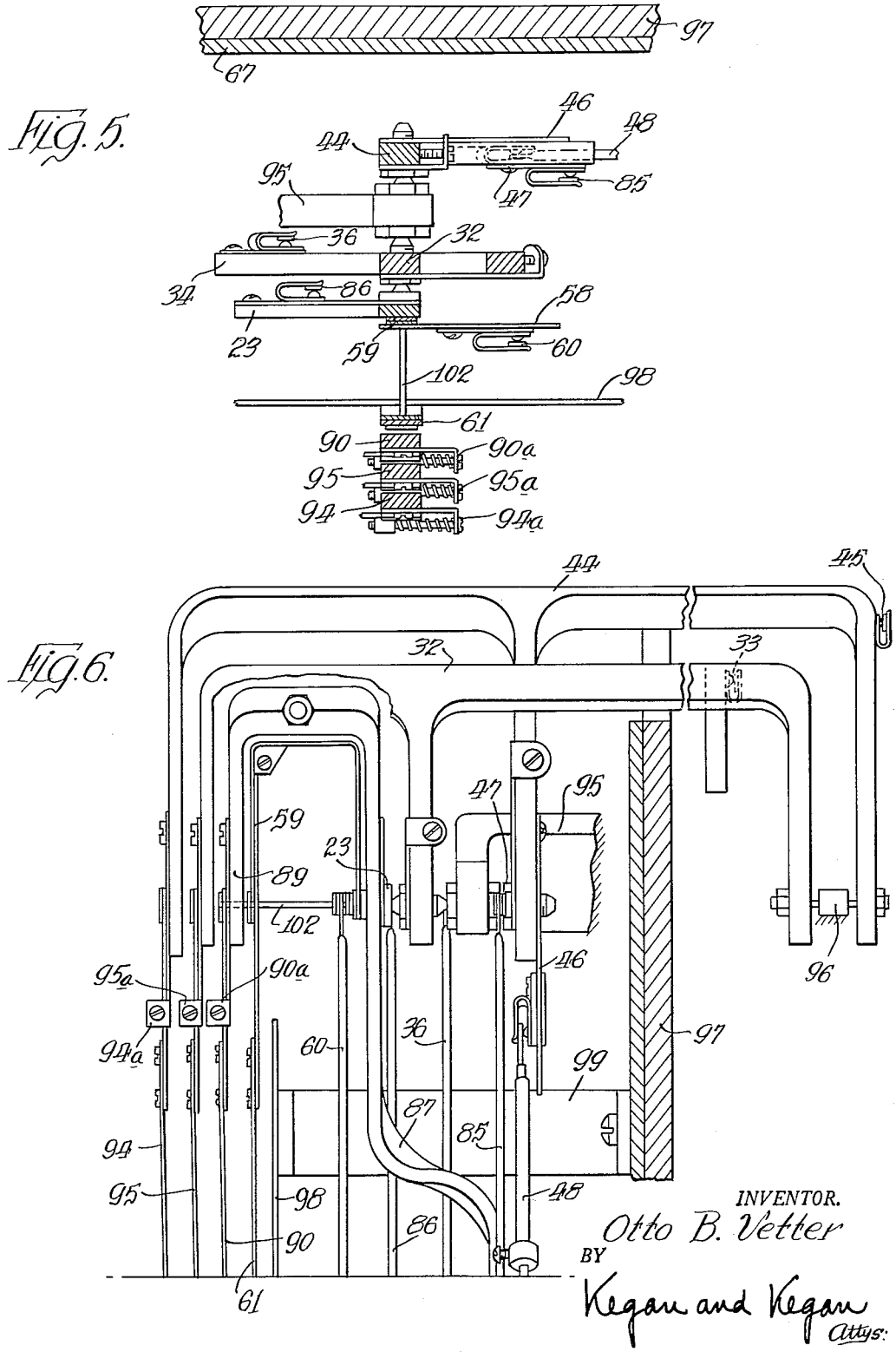

INVENTOR.
Otto B. Vetter

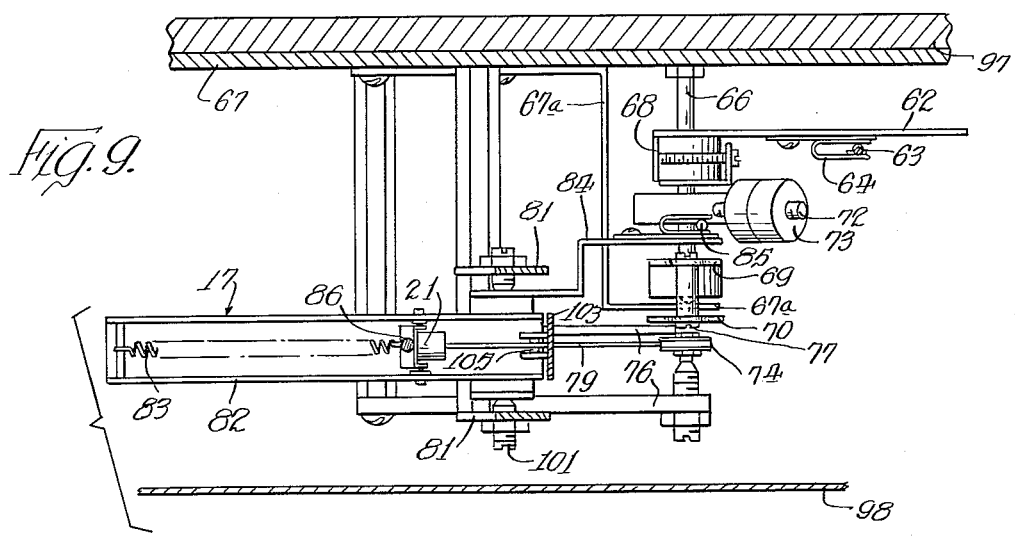
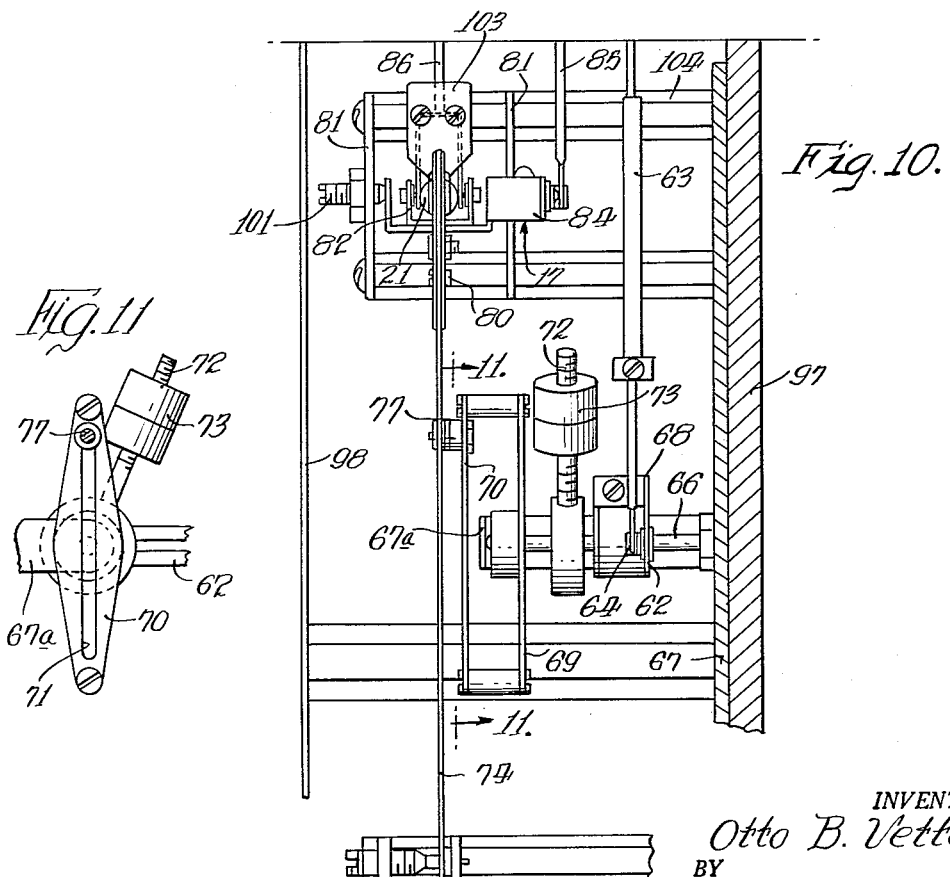

United States Patent Office 2,746,292
Patented May 22, 1956

2,746,292

APPARATUS FOR MEASURING THE NET AMOUNT OF FOREIGN MATTER IN A FLOWING LIQUID

Otto B. Vetter, McKeesport, Pa., assignor to Hagan Corporation, Pittsburgh, Pa., a corporation of Pennsylvania Application April 5, 1952, Serial No. 280,776

5 Claims. (Cl. 73—205)

This invention relates to mass flow measuring apparatus and more particularly to apparatus for measuring the net amount of foreign matter in a flowing liquid. A typical application is, measuring the net amount of solid particles in a slurry, either in terms like pounds per minute or tons per day, or in total weight handled within a certain number of minutes or days or the like. The foreign matter may be solid or gaseous or even liquid.

Another typical application is, measuring the concentration of a flowing mixture.

Such measurements are useful for instance in classifiers, in dredging operations, and in many other operations involving slurry flows and the like.

In the past it has been difficult if not impossible to make measurements of this kind, except with the inherently limited and cumbersome method of taking more or less representative samples and determining their specific gravity by known batch processes.

Continuous flow measuring instruments are well known; and it has been proposed in the past to measure for instance a slurry flow rate and simultaneously to make specific gravity measurements by means of by-pass arrangements and the like. However, the by-pass as well as the flow rate measuring connections tended to clog, either completely or partially, leading to faulty measurements and expensive maintenance problems. It then became usual to connect back-flushing water lines or the like to these by-passes and other lines. However, the expense for back-flushing, which is not inconsiderable, was frequently wasted because the back-flush was applied only intermittently, between intermittent measuring operations; it was possible for lines to become clogged or partly clogged while the back-flush was disconnected.

It has occurred to me that, if a slurry or the like be passed through a vertical conduit and if the back-flush of the transmitting lines be made continuous, it is possible not only to dispense with the usual extra by-pass for specific gravity measurements but also to avoid past difficulties with flow measurements.

It is necessary for this purpose to form a new combination of basically known and well standardized elements of instrumentation, and thereby to apply a proper system of compensation and correction to the principal measurements in question. More particularly, the new concept is based on the use of a main conduit which is vertical or contains a vertical component; a differential deriving device in said main conduit; a continuous back-flush device for the differential deriving device; two branches of the continuous back-flush system being continuously utilized to derive a specific gravity response in the back-flush fluid, not in the slurry or other mixture. A measuring instrument is normally connected to differential transmitting lines and to the branches of the back-flush lines. It contains:

(a) Means to reflect the pressure difference between the back-flush lines connected across the differential deriving device, which difference is proportional with the square of the flow rate of the slurry;

(b) Means to reflect the uncorrected response to the specific gravity of the slurry near the impulse connections, which response is obtainable by the back-flush branches; and (c) Means to correct the last mentioned measurement, notably by an exponential function of the first mentioned measurement.

Desirably this instrument also contains:

(d) Means to multiply the corrected measurement (c) with the first mentioned measurement (a) and to reflect the product obtained for purposes of indicating, recording, integrating, or controlling the net amount of solids entrained in the flow.

This general concept as well as the specific manner of achieving it will be understood more clearly upon consideration of the detailed disclosure which follows, which is a continuation in part of my co-pending application Serial No. 216,173 filed March 17, 1951, now abandoned. It will be understood that the particular description to be given and the particular illustration appended are illustrative of preferred forms only, and that the invention is not restricted to the particular details recited or shown.

In the drawing:

Figure 4 is a view similar to Figure 3 but showing the linkages in a different position.

Figure 5 is a sectional plan view, taken along the lines 5—5 in Figure 3.

Figure 6 is a side elevation, partly in section, of the details shown in Figure 5.

Figure 9 is a sectional plan view taken along the lines 9—9 in Figure 3.

Figure 10 is a side elevation partly in section of the details appearing in Figure 9.

Figure 11 is a detail view, taken along lines 11—11 in Figure 10.

Like reference characters designate like parts in the drawing and in the description of the invention which follows.

Figure 1:
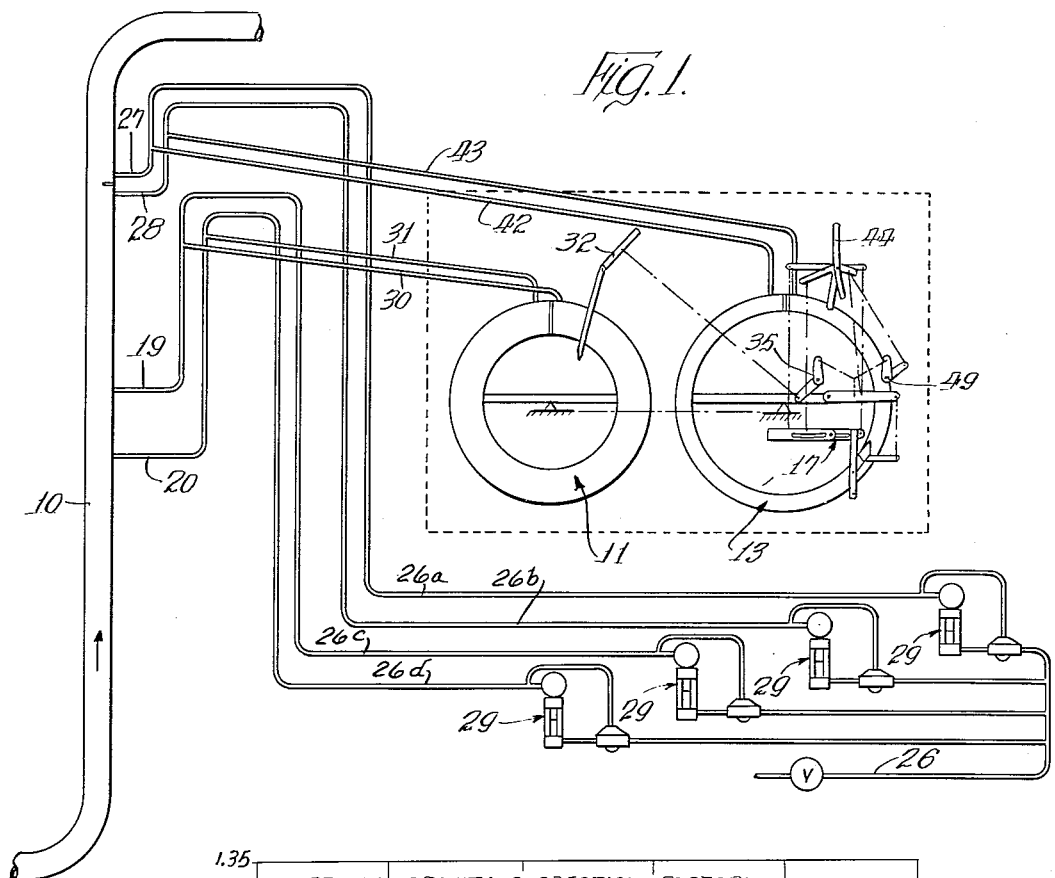
Figure 1 is a diagrammatic view of apparatus according to this invention.
Figure 3:
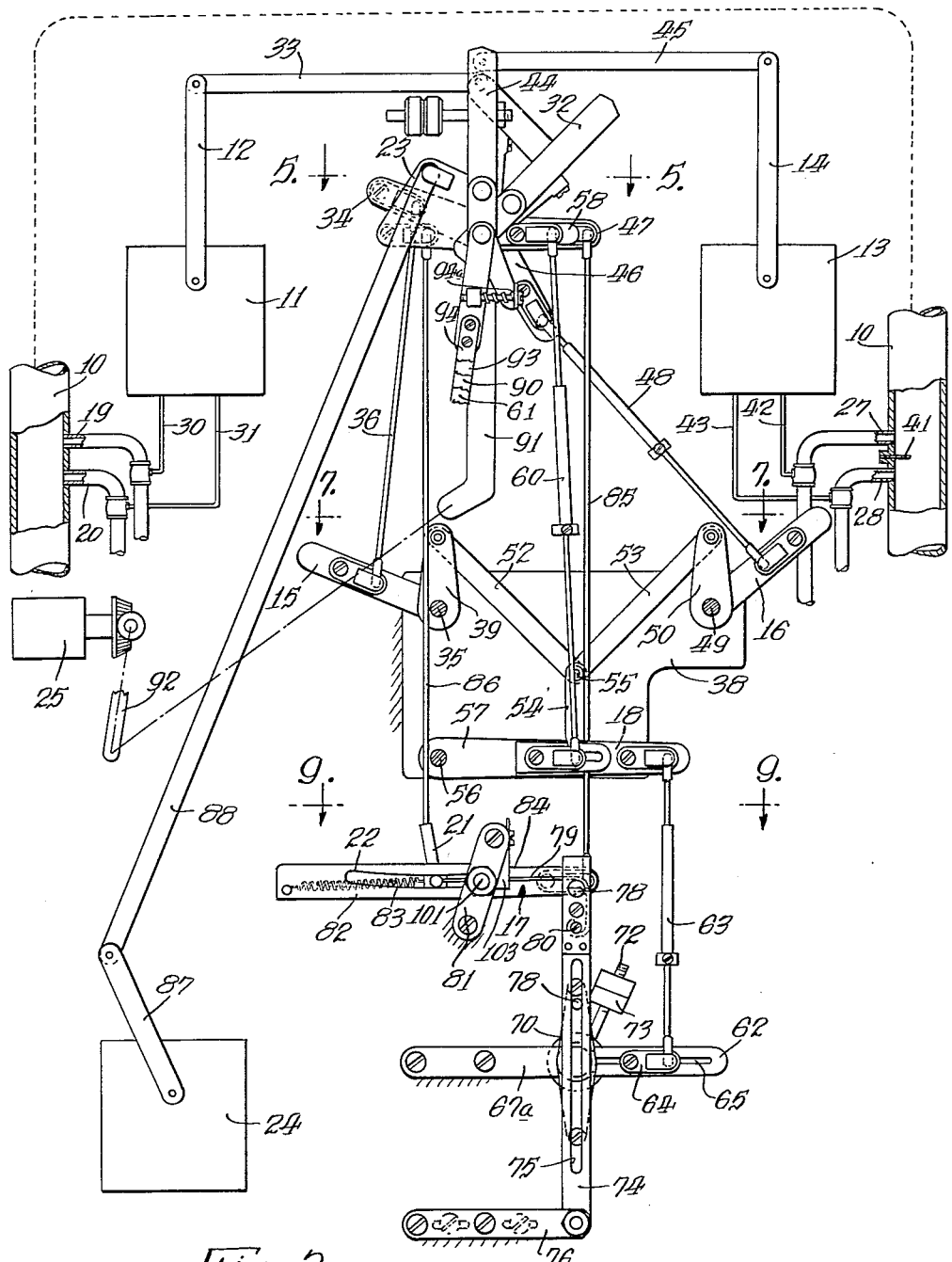
Figure 3 is a diagrammatic front view of the principal parts of the apparatus with emphasis on mechanical linkages forming part thereof.
Figure 2:
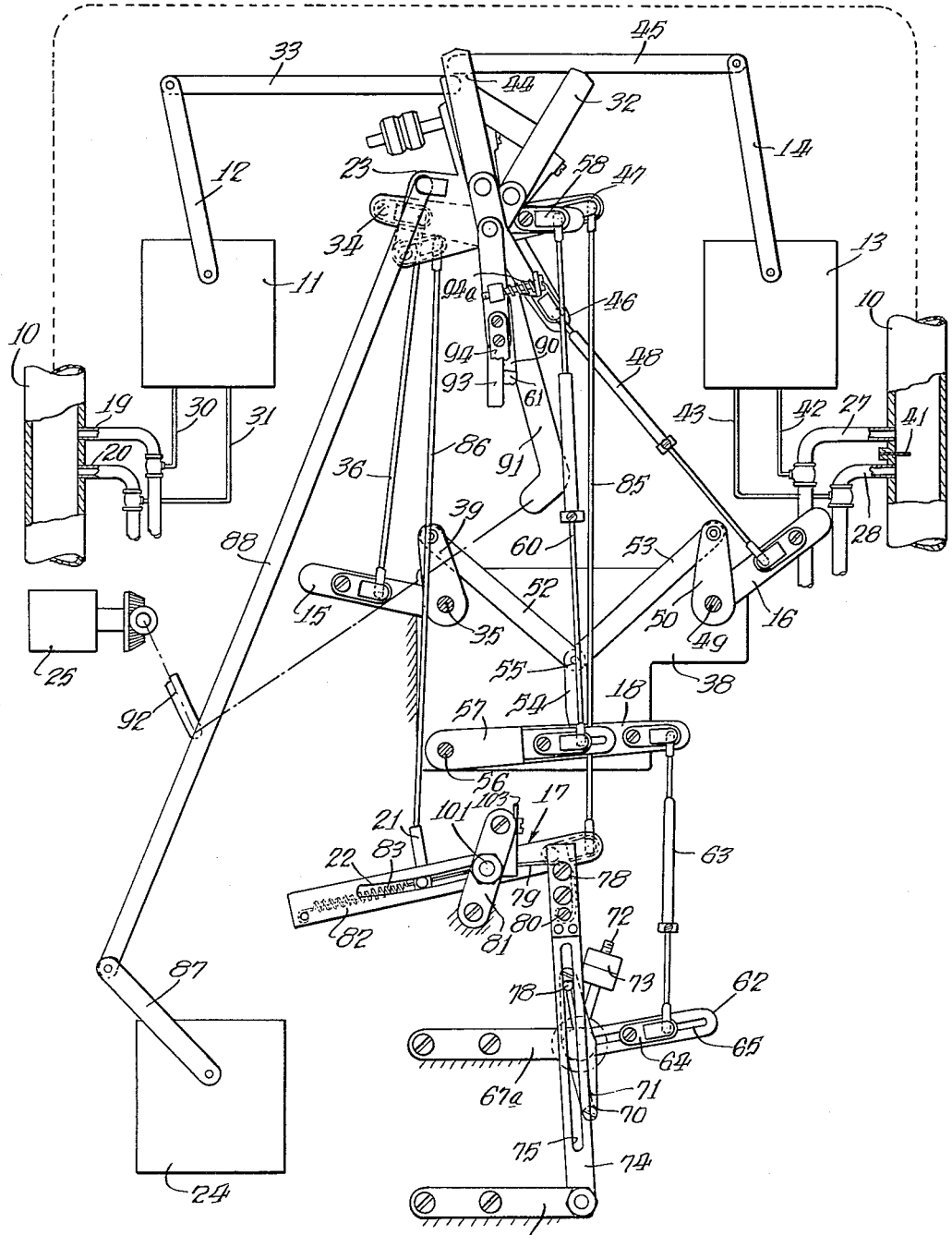

Referring first to the apparatus and particularly to the basic arrangement disclosed in Figures 1, 3 and 4 it will be assumed that a mixture such as a coal slurry passes upwardly through the vertical or rising portion of the conduit 10, from a source not shown to a point of destination or disposal not shown. An instrument 11 having an output arm 12 (Figures 3 and 4) is provided to reflect the specific gravity measurement, while an instrument 13 with an output arm 14 (Figures 3 and 4) is provided to reflect a conventional rate of flow measurement. The two instruments are interconnected both mechanically and hydraulically. The mechanical interconnection is effected principally by levers 15 and 16 moving proportionally with the output arms 12 and 14 respectively, with the aid of additional linkage comprising mainly a multiplying coupling 17 known for instance from the patent of Bean, No. 2,379,874, and summation coupling 18 known for instance from my Patent 2,527,282. The hydraulic interconnection is effected principally by the branches 19 and 20 of a flushing and specific gravity testing system which also serves to backflush the connections of instrument 11. These branches, or impulse connections for specific gravity measurement, are connected to the pipeline 10 a substantial distance downstream of the nearest source of special turbulence; for instance as shown approximately five pipe diameters downstream of the nearest turn in the pipe. The vertical distance between the two impulse connections 19 and 20 can often be approximately 20 inches. Again, the last or uppermost specific gravity impulse connection 19 is desirably spaced from the first or lowermost connection for flow rate measurement, and from the entire differential deriving apparatus, by a further appreciable distance such as three pipe diameters, in order to avoid hydraulic interference between both measuring systems.

In this manner clear and undistorted measurements of specific gravity and flow rate are received in the instruments 11 and 13 respectively. However, attention must be given to the fact that the specific gravity impulse connections 19 and 20, being backflush lines connected to a flowing or dynamic slurry flow system 10 as described, do not transmit a multiple or fraction of the specific gravity, but such a multiple or fraction plus a function of the dynamic head loss in the slurry flow, incurred over the distance between the junctures of the duct 10 with impact connections 19 and 20. These connections would transmit a plain multiple or fraction of the specific gravity only if the flow in the pipe 10 were stopped and static conditions were established therein.

Accordingly the mechanism connected with the instruments 11 and 13 must not only multiply the measurements of the two instruments with one another, for a mass flow reading, but must previously summate the uncorrected specific gravity function with a function of the flow rate. According to a further refinement the summating mechanism can be adapted to modify the flow rate function (to be applied to the specific gravity measurement) in accordance with an empirical curve representing typical relationships between specific gravity of slurry and percentage of dry solids entrained therein. Such curve fitting mechanism is known from my Patent No. 2,570,410.

In Figure 3 I have shown, among other things, the multiplying linkage including the cross head 21 forming part thereof. This cross head is longitudinally movable along a slot 22 and also angularly movable by the multiplying linkage as will be described in greater detail hereinafter; and its compound movements are transmitted to a crank 23 which reflects the magnitude of the mass rate of flow of solids entrained in the carrier liquid. The measurement by crank 23 in turn is transmitted to a control device 24 which may, for example, be a transmitter of the time impulse type. Details of such transmitters are well known to the art and do not have to be described herein. Such a transmitter can be used, for instance, to control mechanism (not shown) to vary the input of solids into the line 10 in response to the mass flow measurement of such solids. In addition, the position of the crank 23 can be utilized for other operations; for instance, the instantaneous measurements of the mass rate of flow of solids can be integrated over a period of time by a conventional integrator unit 25.

In this manner the present system can be made either self-controlling or merely measuring, with the usual indicating, recording and integrating functions or with other refinements such as proportioning of solids flow rate to flow rates other than those in the line 10. It will be seen, mainly on reference to Figure 1, that these desirable results are obtained with means of extreme simplicity insofar as the hydraulic connections are concerned, and further, with enhanced safety and reliability due to the continuous backflush through the system. The system simply uses branches 26a, 26b, 26c and 26d of a small line 26, for each of the measuring connections. Line 26 and its branches may carry water or other clear liquids or sometimes air or other gases. The branches 26d and 26c are connected to the specific gravity lines 20 and 19 respectively and the branches 26a and 26b are connected to the downstream and upstream differential pressure connections 27 and 28 respectively. A flow regulating and pressure controlling valve 29 is inserted in each branch line and of course the flow in these lines is kept rapid enough to prevent or counteract the adherence or the settling of solid particles, which tend to enter these lines from the slurry line 10, mainly during and after a shutdown of the system. The connections between the flushing lines and the instruments 11 and 13 desirably slope to the instruments, as indicated in connection with the specific gravity connections 30 and 31 and the flow-meter connections 42 and 43; in this manner air binding of the instruments can be safely avoided.

Figure 7:
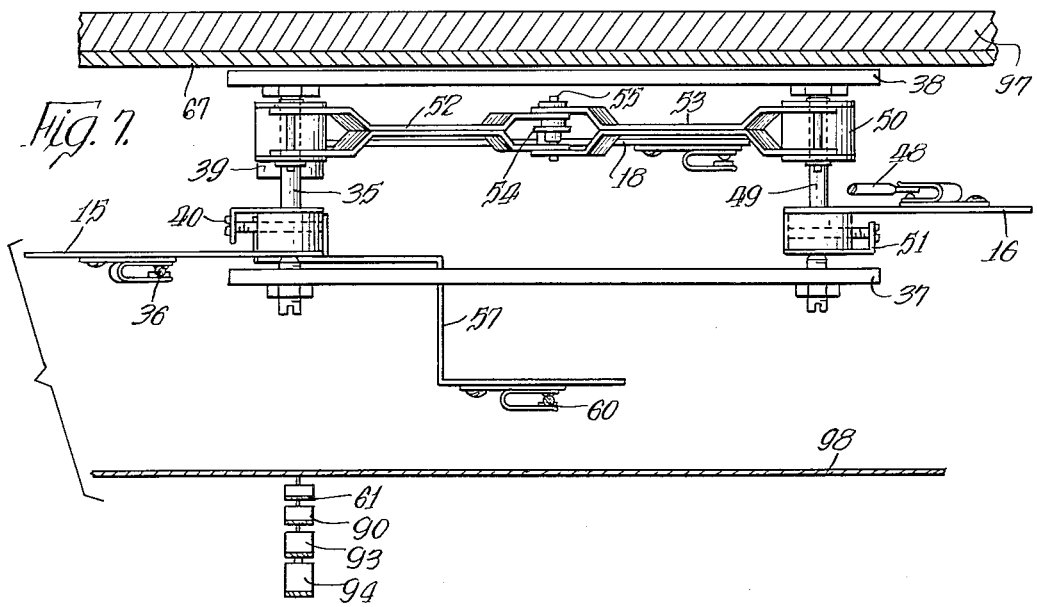
Figure 7 is a sectional plan view taken along the lines 7—7 of Figure 3.

Referring now to the details of Figure 3, movement of the arm 12 is transmitted to a yoke 32 through a link 33. The yoke 32 is pivoted on a horizontal bearing for a plurality of yokes and pen arms. The yoke is rigidly connected with a lever arm 34, which rocks a shaft 35 by means of a link 36 interconnecting the arms 34 and 15; the latter being secured to the shaft 35. The shaft 35 further carries a crank 39, at an angularity with lever 15 which is adjustable by the coupling 40 (Figure 7). At any one setting the crank levers 15 and 39 are rigid with respect to one another and the movement of the output lever 39 follows the motion of the arm 12 of the specific gravity instrument 11.

Referring now to the flow metering instrument 13 which is connected to the line 10 across the orifice plate 41 by means of inclined impulse connections 42, 43 (Figure 1), and mechanically connected to a yoke 44 on the main instrument shaft by the arm 14 and link 45: this second yoke has two output arms 46 and 47 both connected with the specific gravity instrument, one (47) by the summation linkage and the multiplier cross head and the other (46) by the multiplier linkage lever.

Figure 8:
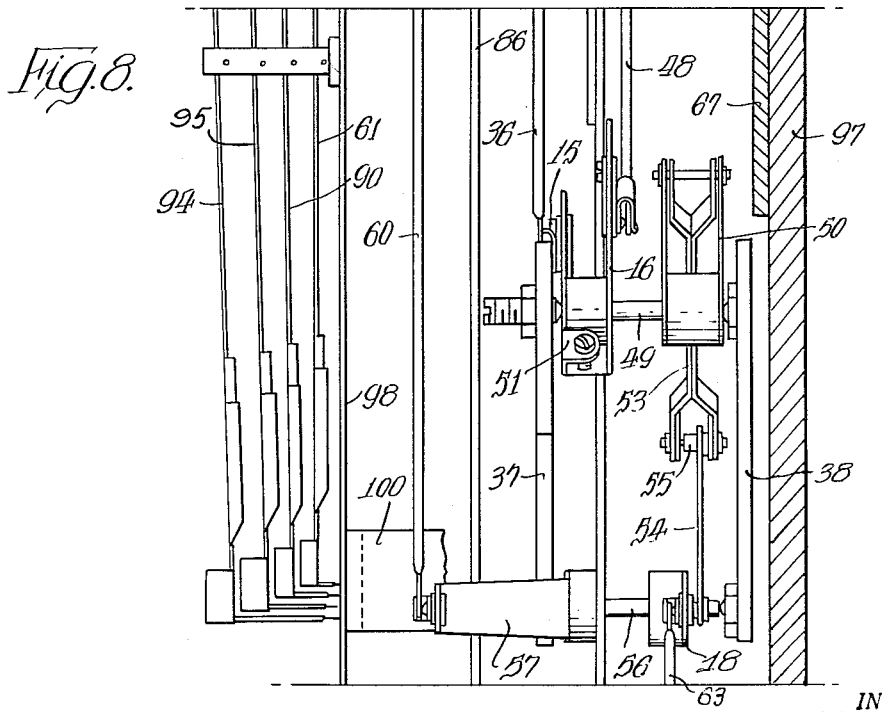
Figure 8 is a side elevation partly in section of the details appearing in Figure 7.

Movement of the first flow metering arm 46 is transmitted to the lever 16 through the adjustable link 48. Lever 16 is pivoted on the shaft 49 and forms a part of the bell crank 50, the angularity of which is adjustable by a coupling 51 (Figure 7). The levers 39 and 50 form the input arms of the summation linkage. They are interconnected by the two rocker arms 52 and 53, which converge to and are jointly pinned to a follower link 54, at point 55. As best shown in Figure 8 the other end of the follower link 54 is connected to an arm 18 which is fixed to the rotatable shaft 56. An output lever 57 is fixed to this shaft and drives the arm 58 of the yoke 59, journaled on the main bearing, through an adjustable link 60.

It will be noted that the yoke 59 exhibits a value derived by summating the uncorrected specific gravity measurement of the levers 12 and 39 with a certain function of the flow rate, obtained by the levers 46 and 50. It should further be noted that the levers 46 and 50 are so interconnected, by the link 48 and lever 16, that the movements of the arm 50 substantially reflect an exponential function of the flow rate response of the arm 46; it being necessary to correct the pressure difference between lines 19, 20 by an error proportional with the square of the flow rate in the main conduit 10. In many instances the motion of the arm 50 is rather small as compared with that of the arm 39; but it is nevertheless important that the said error be eliminated in order to obtain desirable accuracy of specific gravity measurements, without the use of batch type tests.

The corrected specific gravity measurement, exhibited by the motion of the arm 18, is further modified in the following manner: The motion of the arm 18 is transmitted to a lever 62 by a link 63. The pivot assembly 64 of this link, connecting it with the lever 62, is adjustable along a slot 65, so that the moment arm of the lever 62 can be changed. The lever 62 is secured to a shaft 66 and as best shown in Figure 10 this shaft is angularly adjustable with respect to the lever 62 by a coupling 68. Also secured to the shaft 66 is the drive arm 69 of a radial coupling. This drive arm rigidly supports a member 70, having a slot 71 (see Figure 11) extending across the axis of the shaft 66. A threaded stud 72 is also secured to the shaft 66 and carries a weight 73 for balancing the radial linkage. This linkage additionally comprises a lever 74 (see Figure 3) having a slot 75 and being pivoted at a point 76 below the shaft 66. The slots 71 and 75 are interconnected by a trunnion 77 which is adjustable in both of these slots.

The free end of the lever 74 carries a roller 78, adapted to guide a cable 79 which is fastened to a windup screw 80 on the lever 74. The cable 79 serves to transmit the summation response of the levers 18 and 62, modified by the radial linkage 70, 74, to the multiplying coupling. This latter coupling comprises mainly the swingable lever 17 and the cross head 21 slidable along the same. In order to control the sliding of cross head 21, the lever 17 comprises a housing 82 best shown in Figure 9, which has an arcuate slot 22 in each wall thereof, the front slot 22 being shown in Figure 3. The cross head 21 is adapted to move along the slots 22 and is urged to the left as seen in Figure 3 by a spring 83, but only so far as allowed by the cable 79. The housing 82 is further rigidly connected with an arm 84, shown in Figures 3 and 9. By means of this arm 84 the multiplier and cross head is angularly moved proportionally with the motions of the flow rate responsive arms 14 and 47, through the intermediary link 85. Simultaneously the cross head 21 moves along the arcuate slot 22 in accordance with the motions of the arm 12 of the specific gravity instrument 11, corrected by the summation and radial couplings as described. This compound motion of the cross head 21 in turn is transmitted to the principal crank 23 of the instrument, through the link 86.

In the embodiment shown the motion of the crank 23 is further transmitted to the control arm 87 of the control device 24 through the link 88. The crank 23 is an extension of the yoke 89 shown in Figure 6, which yoke also positions a pen 90 and an integrator takeoff arm 91, coupled to the input arm 92 of the integrator unit 25.

Each of the yokes shown and described may carry a pen 90, 90a, 90b and 90c, to indicate respectively the mass flow rate of solids (that is the product of the corrected specific gravity and the flow rate), the liquid flow rate, the uncorrected specific gravity and the corrected specific gravity.

Figure 2:
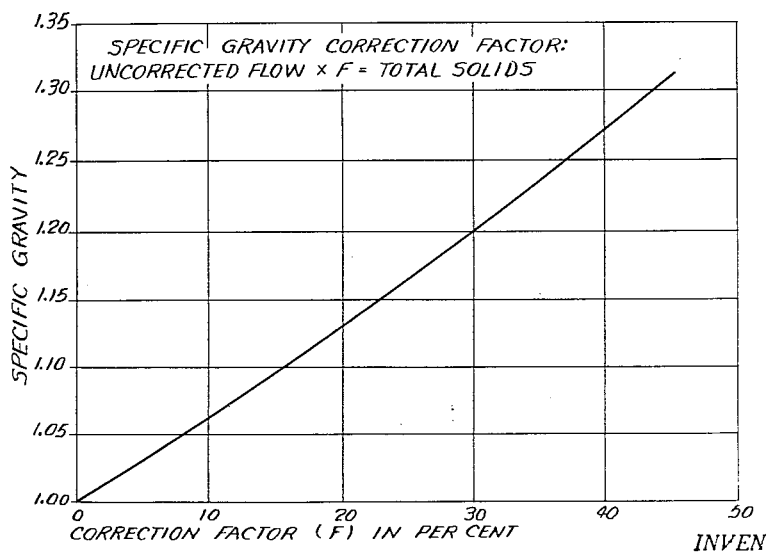
Figure 2 is a chart showing typical relationships between the specific gravity of a mixture and a certain correction factor relating thereto and involved in the adjustment and operation of the apparatus, as will be explained.

I have indicated that the correction of the specific gravity by link 48 is substantially proportional with an exponential function of the flow rate reading, and I will now explain why this correction, reflected by the summation responsive link 18, is further modified by the radial coupling. Figure 2 shows a plot of the specific gravities of certain types of slurry, plotted against correction factors for determining the total solids in the flows of such slurries. This plot or curve is based on empirical determinations, made for the specific slurries or types of slurry by means of batch tests or the like. It may also reflect the dilution of slurry by backflush water, downstream of the instruments. The particular curve shown is for water slurries of different concentration in which the specific gravity of the dry solids is 2.65. In other types of slurry the curve has different slope. In any case this slope is desirably impressed upon the response of the summation linkage, by means of the radial linkage. This is achieved by varying the geometric relation between the arm 18 and the crank 62 and by additionally varying the relation between the lever 70 and 74, by the link 63 and trunnion 77 respectively.

In Figure 3 the instrument linkage can be assumed to be in position for zero or low flow, and for a specific gravity equal to a predetermined control level. Figure 4 shows the manner in which the linkage moves as the specific gravity and the flow rate change. It can be assumed that the specific gravity as well as the flow rate has been increased. The arm 15 is moved counterclockwise, shifting the arm 18 counterclockwise. A slight but increased velocity-square correction is applied by the summation linkage to the uncorrected specific gravity response. In the drawing it appears that the lever 16 has not moved appreciably, but it has undergone a slight counterclockwise movement. Such counterclockwise movement of the lever 16 tends to move the lever 18 in a clockwise direction, thereby decreasing the counterclockwise rotation of the lever 18 effected by the aforementioned rotation of the lever 15. Usually the basic effect of the increase in specific gravity is relatively greater than its correction; therefore the rotation of the arm 18 remains counterclockwise, only at a reduced rate. It results in counterclockwise rotation of the arm 62 and, at a modified rate, of the arm 74. This allows the spring 83 to pull the cross head 21 to the left side along the slot 22, to a new equilibrium position. At the same time, the increased flow causes the housing 82 of the multiplier linkage to rotate in a counterclockwise direction.

It will be understood that the pens 90, 90a, 90b and 90c not only indicate the different functions but also record the same on a suitable chart (not shown), thereby providing a complete record not only of the main measurement sought—the true mass flow rate of the solids— but also of its component factors, that is, mainly the slurry flow rate and the corrected specific gravity. Recording of the uncorrected specific gravity of course can often be omitted. The automatic integrating and controlling mechanisms 24, 25 are actuated only by the fourth and last instrument yoke, while a detailed record is made by the different pens in order to enable the operator to determine whether changes in overall yield of mass flow of solids were due to changes in slurry flow rate alone or to changes in specific gravity alone, or to a combination of both.

So far as I know, informative measurement of this kind has not previously been achieved; particularly not with simple and reliable hydraulic connections as shown.

Upon a consideration of this disclosure, it will be obvious to persons skilled in the art that a number of modifications can be applied to the particular apparatus features disclosed, all within the scope of this invention. While I do not wish to extend this description by specific reference to possible modifications, I wish it to be understood that I claim the scope of this invention as broadly as allowed by law and as indicated in the claims which follow.

I claim:

1. Apparatus for measuring the net amount of undissolved matter in a flowing liquid, comprising a specific gravity meter; a first pair of fluid pressure lines conecting said specific gravity meter to vertically spaced inlets in a vertical header in which said liquid is flowing; a flowmeter; a second pair of fluid pressure lines connecting said flowmeter to opposite sides of a flow orifice in said vertical header; a first lever positioned by said specific gravity meter; a second lever positioned by said flowmeter; a third lever; means actuated by said second lever positioning said third lever in accordance with the square root of the deflection of said second lever; a fourth lever; a summation linkage actuated by said first and third levers to position said fourth lever in accordance with the sum of the deflections of said first and third levers; a multiplication linkage positioned by said second and fourth levers in accordance with the product of the deflections of said second and fourth levers; and an output member positioned by said multiplication linkage to exhibit the true mass rate of flow of said undissolved matter.

2. Apparatus as described in claim 1 and additionally comprising a radial coupling positioned by said fourth lever and operating upon said multiplication linkage to adjust the position of said output member in accordance with a predetermined correction curve.

3. Apparatus for measuring the net amount of undissolved matter in a flowing liquid, comprising a vertical header in which said liquid flows upward; a primary orifice in said header; a first pair of back flush lines discharging into said header, one on each side of said primary orifice and adjacent thereto; a second pair of back flush lines discharging into said header away from the effect of said primary orifice and vertically spaced from each other; means forcing wash liquid constantly through all said flush lines; a flowmeter operatively connected to said first pair of back flush lines; a specific gravity meter operatively connected to said second pair of back flush lines; automatic computing means comprising means interconnecting the flowmeter with the specific gravity meter and actuated by said flowmeter to correct the indication of the specific gravity meter in accordance with a function of the indication of the flowmeter, means interconnecting the flowmeter with the means for correcting the specific gravity indication to continuously multiply the flowmeter indication by the corrected specific gravity indication, and means for continuously exhibiting the net amount of undissolved matter in said flowing liquid under measurement, said exhibiting means being controlled by said multiplying means.

4. Apparatus for measuring the mass flow rate of undissolved matter in a flowing liquid, comprising a header through which said liquid flows; a primary orifice in said header; a first pair of back flush lines discharging into said header, one on each side of said primary orifice and adjacent thereto; a second pair of back flush lines discharging into said header away from the effect of said primary orifice and vertically spaced from each other; means forcing wash liquid constantly through all said flush lines; a flowmeter operatively connected to said first pair of back flush lines at a point spaced from their discharge into the header; a specific gravity meter operatively connected to said second pair of back flush lines at a point spaced from their discharge into the header; and automatic computing apparatus comprising a first means positioned by said specific gravity meter, a second means positioned by said flowmeter, flow rate linkage means positioned by said second means in accordance with a square root function, summation linkage means actuated by said first means and said flow rate linkage means, multiplication linkage means positioned by said second means and said summation linkage means, and means controlled by said multiplication linkage means to exhibit a motion proportional to the mass flow rate of undissolved matter in said flowing liquid.

5. Apparatus for measuring the net amount of undissolved matter in a flowing liquid, comprising a vertical header in which said liquid flows upward; a primary orifice in said header; a first pair of back flush lines discharging into said header, one on each side of said primary orifice and adjacent thereto; a second pair of back flush lines discharging into said header away from the effect of said primary orifice and vertically spaced from each other; means forcing wash liquid constantly through all said flush lines; a flowmeter operatively connected to said first pair of back flush lines; a specific gravity meter operatively connected to said second pair of back flush lines; a flow rate indicator, means controlled by said flowmeter to position said flow rate indicator in accordance with a half-power function of the differential pressure sensed by said flowmeter; a summation linkage controlled by the positions of said flow rate indicator and said specific gravity meter; a summation indicator controlled by said summation linkage; a multiplication linkage controlled by the positions of said flow rate indicator and said summation indicator; and an output indicator controlled by said multiplication linkage to exhibit the net rate of flow of said undissolved matter.

References Cited in the file of this patent
UNITED STATES PATENTS

| | | |
|---|---|---|
| 1,761,295 | Greenfield | June 3, 1930 |
| 1,990,633 | Brandl | Feb. 12, 1935 |
| 2,570,410 | Vetter | Oct. 9, 1951 |